UNITED STATES PATENT OFFICE.

PIERSON T. WALTON, OF SUTTON, NEBRASKA.

REMEDY FOR HOG-CHOLERA.

SPECIFICATION forming part of Letters Patent No. 359,652, dated March 22, 1887.

Application filed September 15, 1886. Serial No. 213,638. (No specimens.)

*To all whom it may concern:*

Be it known that I, PIERSON T. WALTON, a citizen of the United States, residing at Sutton, in the county of Clay and State of Nebraska, have invented certain new and useful Improvements in Remedies for Hog-Cholera; and I do hereby declare the following to be a full, clear, and exact description of the invention, such as will enable others skilled in the art to which it appertains to make and use the same.

My invention relates to compounds for treating animals for the prevention and cure of cholera and other like diseases.

The invention consists in combining certain ingredients in the manner and in about the proportions hereinafter named.

In making the compound I mix the following ingredients, in about the proportions named: oil of tar, two ounces; oil of sassafras, one-fourth of an ounce; pepper-pods, four ounces; water, one gallon. Boil for thirty minutes; then add sulphur, one ounce; sulphate of iron, (copperas,) one ounce. Mix or shake well, and the compound is ready for use.

The dose for a hog of one hundred and fifty to two hundred pounds is about one gill; other sizes proportionally. It may be administered in its feed or slop, by drenching, or other convenient way. For prevention, give an ordinary dose once a week, or thereabout. When the animals are sick, use the medicine about three times a day, according to the virulence of the disease, until they begin to improve, when the frequency and amount of the dose should be diminished.

I claim—

The within-described compound, consisting of an infusion of oil of tar, oil of sassafras, and pepper-pods, with the addition of sulphur and copperas, all in about the proportions named, for the purposes set forth.

In testimony whereof I affix my signature in presence of two witnesses.

PIERSON T. WALTON.

Witnesses:
 JACOB STEINMETZ,
 ELMER E. BRAUNNER.